(12) United States Patent
Yang et al.

(10) Patent No.: US 9,786,906 B2
(45) Date of Patent: Oct. 10, 2017

(54) COMPOSITE CATHODE MATERIALS WITH CONTROLLED IRREVERSIBLE CAPACITY LOSS FOR LITHIUM ION BATTERIES

(75) Inventors: Jihui Yang, Bellevue, WA (US); Yan Wu, Troy, MI (US); Yong Yang, Xiamen (CN); Sihui Wang, Xiamen (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 14/420,198

(22) PCT Filed: Aug. 8, 2012

(86) PCT No.: PCT/CN2012/079820
§ 371 (c)(1),
(2), (4) Date: May 26, 2015

(87) PCT Pub. No.: WO2014/022986
PCT Pub. Date: Feb. 13, 2014

(65) Prior Publication Data
US 2015/0303453 A1   Oct. 22, 2015

(51) Int. Cl.
| | |
|---|---|
| H01M 4/36 | (2006.01) |
| H01M 10/0525 | (2010.01) |
| H01M 4/505 | (2010.01) |
| H01M 4/525 | (2010.01) |

(52) U.S. Cl.
CPC .......... *H01M 4/364* (2013.01); *H01M 4/505* (2013.01); *H01M 4/362* (2013.01); *H01M 4/525* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 7,018,607 B2 | 3/2006 | Nazri et al. | |
| 7,678,503 B2 | 3/2010 | Manthiram et al. | |
| 8,148,455 B2 | 4/2012 | Posudievsky et al. | |

(Continued)

FOREIGN PATENT DOCUMENTS

| | | |
|---|---|---|
| CN | 101080830 A | 11/2007 |
| CN | 101542788 A | 9/2009 |

(Continued)

OTHER PUBLICATIONS

Liu et al., "Carbon-coated high capacity layered Li[Li0.2Mn0.54Ni0.13Co0.13]O2 cathodes," Mar. 27, 2010, Electrochemistry Communications, 12, 750-753.*

(Continued)

*Primary Examiner* — Ula C Ruddock
*Assistant Examiner* — Matthew Van Oudenaren
(74) *Attorney, Agent, or Firm* — Harness, Dickey & Pierce, P.L.C.

(57) ABSTRACT

Composite materials for a cathode of an electrochemical cell. The composite materials comprise Li[M1-xLix]O2 or yLi2MnO3.(1-y)LiMO2 (M=Ni, Co, Mn, 0<x<0.5, 0<y<1), and at least one of LiMn1.5Ti0.5O4 and LiMn1.5Ni0.5O4. A Li-ion electrochemical cell including a cathode comprising the composite materials is also provided. The Li-ion electrochemical cell controls irreversible capacity loss and maintain a good cycling stability.

14 Claims, 3 Drawing Sheets

(56) References Cited

U.S. PATENT DOCUMENTS

| | | |
|---|---|---|
| 8,568,930 B2 | 10/2013 | Halalay et al. |
| 8,663,840 B2 | 3/2014 | Nazri et al. |
| 8,785,054 B2 | 7/2014 | Halalay et al. |
| 9,023,520 B2 | 5/2015 | Halalay et al. |
| 2006/0051671 A1 | 3/2006 | Thackeray et al. |
| 2006/0228631 A1* | 10/2006 | Miura ............... H01M 4/131 429/232 |
| 2008/0261115 A1 | 10/2008 | Saito et al. |
| 2009/0123842 A1 | 5/2009 | Thackeray et al. |
| 2009/0224212 A1 | 9/2009 | Manthiram et al. |
| 2010/0233550 A1 | 9/2010 | Yanagida et al. |
| 2011/0086272 A1 | 4/2011 | Kepler et al. |
| 2011/0311869 A1* | 12/2011 | Oh ..................... H01M 4/131 429/211 |
| 2012/0009475 A1* | 1/2012 | Nakura ............... H01M 4/131 429/220 |
| 2012/0227252 A1 | 9/2012 | Nazri |
| 2015/0303453 A1 | 10/2015 | Yang et al. |

FOREIGN PATENT DOCUMENTS

| | | |
|---|---|---|
| CN | 101841066 A | 9/2010 |
| CN | 102479947 A | 5/2012 |
| CN | 104641495 | 5/2015 |
| DE | 112012006684 T5 | 4/2015 |
| KR | 20110097719 A | 8/2011 |
| KR | 20150041078 A | 4/2015 |
| WO | WO-2014022986 A1 | 2/2014 |

OTHER PUBLICATIONS

Ning, Gang et al., A generalized cyle life model of recharchable Li-ion batteries. Science Direct, Electrochimica Acta 51 (2006) 2012-2022.

A Guide to Understanding Battery Specifications. MIT Electric Vehicle Team, Dec. 2008.

Zhamu, Aruna et al. Reviving Recharchable Lithium Metal Batteries: Enabling Next-Generation High-Energy and High Power Cells. Electronic Supp.Material (ESI) for Energy and Enviornmental Science,2012.

Ramasamy, Ramaraja P. et al. Simulation of Capacity Loss in Carbon Electrode for Lithium-Ion Cells During Storage. Journal of Power Sources 166 (2007) 266-272.

Ellis, Brian L. et al. Positive Electrode Materials for Li-Ion and Li-Batteries.Chem-Mater,2010,22,691-714.

A First Office Action in Korean Application No. 2015-7005892 from the Korean Intellectual Property Office (KIPO) dated Feb. 25, 2016, with English translation provided by C & S Patent and Law Office; 15 pages.

A First Office Action in Chinese Application No. 201280075191.7 from the Chinese Patent Office dated May 5, 2016, and correspondence from China Patent Agent (H.K.) Ltd. summarizing the First Office Action; 10 pages.

International Search Report for PCT/CN2012/079820, dated May 16, 2013; ISA/CN.

* cited by examiner

COMPOSITE CATHODE MATERIALS WITH CONTROLLED IRREVERSIBLE CAPACITY LOSS FOR LITHIUM ION BATTERIES

FIELD

The present disclosure relates to cathode materials for lithium ion batteries.

BACKGROUND

This section provides background information related to the present disclosure which is not necessarily prior art.

Since the development of the first commercial lithium ion (Li-ion) battery in 1990, Li-ion batteries have been extensively studied by researchers all over the world. Due to the advantages of light weight, high energy density, and long cycle life, lithium ion batteries have been widely used in cell phones, lap-top computers, etc. However, for usage in hybrid, plug-in hybrid and full electric vehicles, Li-ion batteries that can provide even higher energy density and power capability, longer cycling and calendar life, and better safety are needed.

In recent years, due to its high specific capacity, there has been much interest in lithium-rich, metal oxide cathode materials, which can be represented as $Li[M_{1-x}Li_x]O_2$ or $Li_2MnO_3 \cdot LiMO_2$ (M=Ni, Co, Mn). For example, $Li[Li_{0.2}Mn_{0.54}Ni_{0.13}Co_{0.13}]O_2$ can deliver an initial discharge capacity as high as 250 mAh/g when cycled between 4.8 V to 2.0 V at 18 mA/g at room temperature. In this series of materials, lithium partially substitutes for transition metal ions and forms super lattice ordering or "$Li_2MnO_3$-like regions." Powder X-ray diffraction (XRD), high-resolution transmission electron microscopy (HRTEM), and magic-angle-spinning nuclear magnetic resonance (MAS NMR) have shown $LiMn_6$ cation ordering in the transition metal layers of these lithium-rich materials, and this is the characteristic atom arrangement of $Li_2MnO_3$. $Li_2MnO_3$ is electrochemically inactive between 4.5 V and 3.0 V, and it is believed to stabilize the electrochemically active $LiMO_2$ component by maintaining the cathode structure and to improve the discharge capability by extracting lithium concomitant with release of oxygen (a net loss of $Li_2O$) to form $MnO_2$ at high potential.

$LiMn_2O_4$ has the spinel structure with lithium ions in the 8a tetrahedral sites and leaving the 16c octahedral sites empty. $LiMn_2O_4$ can not only de-intercalate one unit of Li from the 8a tetrahedral sites per formula at 4 V, but also can intercalate an additional unit of Li into the 16c octahedral sites at 3 V, resulting in a theoretical capacity of 296 mAh/g. However, the cycling stability of $LiMn_2O_4$ is poor in the 3 V region due to Jahn-Teller distortion.

Though oxygen loss leads to a high discharge capability, lithium-rich materials suffer from an undesirable huge irreversible capacity loss (ICL), which can be about 40 mAh/g to about 100 mAh/g in the first cycle when charged to 4.8 V. Many efforts have been made to reduce the ICL. For example, acid treatment has been an effective method for improving the electrochemical performance of cathode materials. However, it can adversely affect cycling stability and rate capability of the cathodes.

In recent years, composite cathodes have been developed. These composites are blends of lithium-rich material with lithium insertion hosts. In these composites, the lithium insertion hosts act to accommodate the lithium ions that could not be inserted back into layered lattices after the first charge. Although some ICL has been reduced by blending lithium-rich material with lithium insertion hosts, the composite materials exhibit some capacity fade during cycling. Accordingly, there remains a need to improve composite cathodes.

SUMMARY

This section provides a general summary of the disclosure, and is not a comprehensive disclosure of its full scope or all of its features.

In various embodiments, composite materials for a cathode of an electrochemical cell are disclosed. The composite materials comprise either $Li[M_{1-x}Li_x]O_2$ or $yLi_2MnO_3 \cdot (1-y)LiMO_2$ (M=Ni, Co, Mn, 0<x<0.5, 0<y<1), and at least one of $LiMn_{1.5}Ti_{0.5}O_4$ and $LiMn_{1.5}Ni_{0.5}O_4$. A particularly useful pristine material is $Li[Li_{0.2}Mn_{0.54}Ni_{0.13}Co_{0.13}]O_2$, which can comprise particle sizes from about 100 nm to about 300 nm. The $LiMn_{1.5}Ti_{0.5}O_4$ can comprise particle sizes from about 1 μm to about 2 μm. The $LiMn_{1.5}Ti_{0.5}O_4$ particles can have a spinel structure. The at least one of $LiMn_{1.5}Ti_{0.5}O_4$ and $LiMn_{1.5}Ni_{0.5}O_4$ can be mixed with the $Li[M_{1-x}Li_x]O_2$ or $yLi_2MnO_3 \cdot (1-y)LiMO_2$ in various molar ratios to reduce irreversible capacity loss of a Li-ion battery relative to pristine, non-composite materials. When the at least one of $LiMn_{1.5}Ti_{0.5}O_4$ and $LiMn_{1.5}Ni_{0.5}O_4$ and $Li[Li_{0.2}Mn_{0.54}Ni_{0.13}Co_{0.13}]O_2$ are mixed together, the particles can be evenly distributed.

In another embodiment, a Li-ion electrochemical cell comprises a cathode, an anode and a separator disposed between the cathode and anode. The cathode can be composed of a mixture of spinel $LiMn_{1.5}Ni_{0.5}O_4$ and/or $LiMn_{1.5}Ti_{0.5}O_4$ with either $Li[M_{1-x}Li_x]O_2$ or $yLi_2MnO_3 \cdot (1-y)LiMO_2$ (M=Ni, Co, Mn, 0<x<0.5, 0<y<1) in various molar ratios. In various non-limiting aspects, the Li-ion electrochemical cell can be further characterized by a first discharge capacity of from about 190 mAh/g to about 255 mAh/g, a first irreversible capacity loss of from about −100 mAh/g to about 75 mAh/g, and a capacity retention of from about 80% to about 95% of the initial discharge capacity after about 40 cycles. The Li-ion electrochemical cell can be further characterized by a first columbic efficiency from about 75% to about 95% and a charge transfer resistance value of from about 6.5Ω to about 11.5Ω after the second and twentieth cycle, respectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
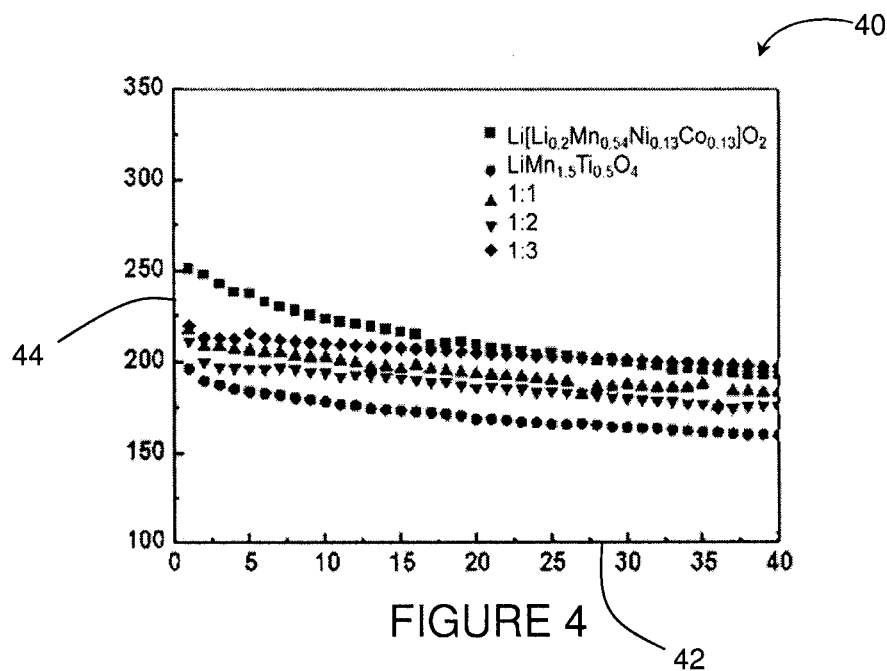
Figure 5:
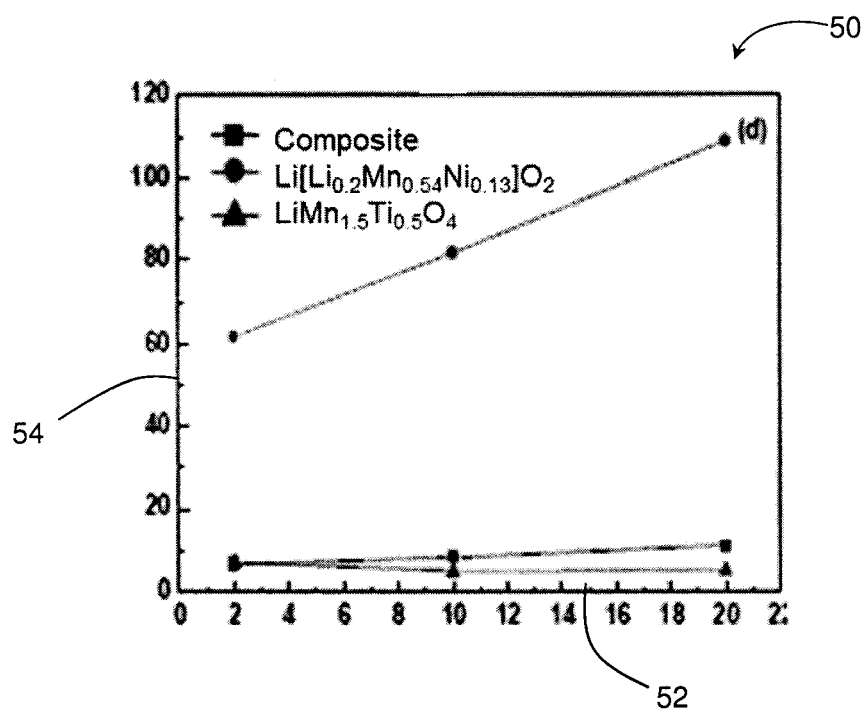

FIG. 4 depicts a graph showing cycle-life performance of Li[Li$_{0.2}$Mn$_{0.54}$Ni$_{0.13}$Co$_{0.13}$]O$_2$, LiMn$_{1.5}$Ti$_{0.5}$O$_4$, and Li[Li$_{0.2}$Mn$_{0.54}$Ni$_{0.13}$Co$_{0.13}$]O$_2$—LiMn$_{1.5}$Ti$_{0.5}$O$_4$ composite electrodes; and FIG. 5 depicts charge transfer resistance values as a function of cycle number for the pristine Li[Li$_{0.2}$Mn$_{0.54}$Ni$_{0.13}$Co$_{0.13}$]O$_2$, the pristine LiMn$_{1.5}$Ti$_{0.5}$O$_4$, and a 1:3 LiMn$_{1.5}$Ti$_{0.5}$O$_4$:Li[Li$_{0.2}$Mn$_{0.54}$Ni$_{0.13}$Co$_{0.13}$]O$_2$ composite electrodes.

DETAILED DESCRIPTION

Example embodiments will now be described more fully with reference to the accompanying drawings. The following description is merely illustrative in nature and is in no way intended to limit the disclosure, its application, or uses. As used herein, the phrase at least one of A and B should be construed to mean a logical (A or B), using a non-exclusive logical "or." It should be understood that steps within a method may be executed in different order without altering the principles of the present disclosure. Disclosure of ranges includes disclosure of all ranges and subdivided ranges within the entire range.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The present technology contemplates a composite composition for a cathode of an electrochemical cell. Such a composite composition can be used in batteries, specifically in a Li-ion battery. The batteries can be used in a variety of applications in which primary or secondary batteries are used, including fuel cells for automotive and transportation applications. As set forth in more detail below, the cathode composite composition of the present disclosure provides batteries having increased material utilization, improved cathode cyclability, increased energy density and decreased irreversible capacity loss as compared to traditional Li-ion batteries.

The cathode composite composition for a Li-ion battery comprises either Li[M$_{1-x}$Li$_x$]O$_2$ or yLi$_2$MnO$_3$·(1−y)LiMO$_2$ (M=Ni, Co, Mn, 0<x<0.5, 0<y<1), and at least one of LiMn$_{1.5}$Ti$_{0.5}$O$_4$ and LiMn$_{1.5}$Ni$_{0.5}$O$_4$. In one aspect, Li[M$_{1-x}$Li$_x$]O$_2$ is Li[Li$_{0.2}$Mn$_{0.54}$Ni$_{0.13}$Co$_{0.13}$]O$_2$. Pristine Li[Li$_{0.2}$Mn$_{0.54}$Ni$_{0.13}$Co$_{0.13}$]O$_2$ particles can be synthesized by a co-precipitation method. The Li[Li$_{0.2}$Mn$_{0.54}$Ni$_{0.13}$Co$_{0.13}$]O$_2$ particles can have a size of from about 100 nm to about 300 nm. Pristine spinel LiMn$_{1.5}$Ti$_{0.5}$O$_4$ particles and pristine LiMn$_{1.5}$Ni$_{0.5}$O$_4$ can be prepared by a solid-state reaction in air. Alternatively, pristine LiMn$_{1.5}$Ti$_{0.5}$O$_4$ can be made by a sol-gel method. The LiMn$_{1.5}$Ti$_{0.5}$O$_4$ particles can have a size of from about 1 μm to about 2 μm. The cathode composite composition can be prepared by mechanically mixing the Li[M$_{1-x}$Li$_x$]O$_2$ or yLi$_2$MnO$_3$·(1−y)LiMO$_2$, and at least one of LiMn$_{1.5}$Ti$_{0.5}$O$_4$ and LiMn$_{1.5}$Ni$_{0.5}$O$_4$ together, whereby the Li[M$_{1-x}$Li$_x$]O$_2$ or yLi$_2$MnO$_3$·(1−y)LiMO$_2$, and at least one of LiMn$_{1.5}$Ti$_{0.5}$O$_4$ and LiMn$_{1.5}$Ni$_{0.5}$O$_4$ are evenly distributed throughout the composite composition.

The present technology also includes a cathode comprising a mixture of either Li[M$_{1-x}$Li$_x$]O$_2$ or yLi$_2$MnO$_3$·(1−y)LiMO$_2$ (M=Ni, Co, Mn, 0<x<0.5, 0<y<1) and at least one of LiMn$_{1.5}$Ti$_{0.5}$O$_4$ and LiMn$_{1.5}$Ni$_{0.5}$O$_4$. Preferably, the cathode comprises a mixture of Li[Li$_{0.2}$Mn$_{0.54}$Ni$_{0.13}$Co$_{0.13}$]O$_2$ and at least one of spinel LiMn$_{1.5}$Ti$_{0.5}$O$_4$ and spinel LiMn$_{1.5}$Ni$_{0.5}$O$_4$. To prepare the cathode, the pristine LiMn$_{1.5}$Ti$_{0.5}$O$_4$ and/or LiMn$_{1.5}$Ni$_{0.5}$O$_4$ can be mechanically mixed with Li[Li$_{0.2}$Mn$_{0.54}$Ni$_{0.13}$Co$_{0.13}$]O$_2$ in different molar ratios to form composite compositions with evenly distributed LiMn$_{1.5}$Ti$_{0.5}$O$_4$ and/or LiMn$_{1.5}$Ni$_{0.5}$O$_4$, and Li[Li$_{0.2}$Mn$_{0.54}$Ni$_{0.13}$Co$_{0.13}$]O$_2$. For example, a LiMn$_{1.5}$Ti$_{0.5}$O$_4$:Li[Li$_{0.2}$Mn$_{0.54}$Ni$_{0.13}$Co$_{0.13}$]O$_2$ molar ratio can be about 1:1, about 1:2 or about 1:3. The cathode is then prepared by coating a mixture comprising about 80% composite composition, about 10% acetylene black, and about 10% binder onto an Al current collector foil. The binder can be styrene butadiene copolymer (SBR), ethylene propylene diene monomer (EPDM) or polyvinylidene fluoride (PVDF). A coating of the mixture can be applied to the Al current collector foil by coating the mixture onto the Al current collector foil about 3 mg/cm$^2$ to about 7 mg/cm$^2$ to form a coated cathode. More preferably, the coating can be from about 4 mg/cm$^2$ to about 6 mg/cm$^2$ up to about 12 mg/cm$^2$, or more if desired, to form a coated cathode. More preferably, the coating can be from about 4 mg/cm$^2$ to about 6 mg/cm$^2$. The coated cathode can be dried at about 120° C. for about 1 hour, resulting in a coating comprising LiMn$_{1.5}$Ti$_{0.5}$O$_4$:Li[Li$_{0.2}$Mn$_{0.54}$Ni$_{0.13}$Co$_{0.13}$]O$_2$ in a substantially even distribution and an average thickness of about 20 μm.

Figure 1:
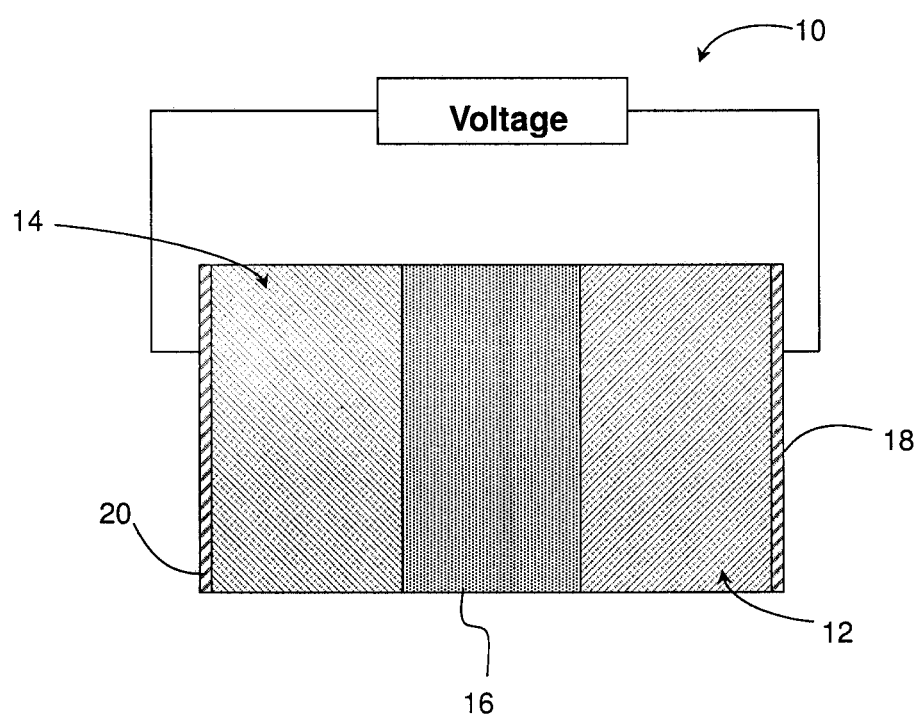
FIG. 1 depicts a schematic diagram of a representative lithium ion electrochemical cell.

The present technology further contemplates a Li-ion electrochemical cell as depicted in FIG. 1 as numeral 10. The Li-ion electrochemical cell 10 includes a positive electrode or cathode 12, a negative electrode or anode 14 and a separator 16 disposed between the cathode 12 and the anode 14. As used herein, the terms "anode" and "cathode" are used to describe the respective electrodes in a discharge or use operation of a Li-ion electrochemical cell 10. It should be noted that complete batteries or cells in accordance with the present teachings may also include terminals, casings, and various other components well known to those of skill in the art, which are not illustrated.

The cathode 12 can comprise a mixture of either Li[M$_{1-x}$Li$_x$]O$_2$ or yLi$_2$MnO$_3$·(1−y)LiMO$_2$ (M=Ni, Co, Mn, 0<x<0.5, 0<y<1) and at least one of LiMn$_{1.5}$Ti$_{0.5}$O$_4$ and LiMn$_{1.5}$Ni$_{0.5}$O$_4$, in various molar ratios. The cathode 12 preferably comprises LiMn$_{1.5}$Ti$_{0.5}$O$_4$ and Li[Li$_{0.2}$Mn$_{0.54}$Ni$_{0.13}$Co$_{0.13}$]O$_2$ in various molar ratios. For example, the LiMn$_{1.5}$Ti$_{0.5}$O$_4$:Li[Li$_{0.2}$Mn$_{0.54}$Ni$_{0.13}$Co$_{0.13}$]O$_2$ molar ratio can be 1:1, 1:2, or 1:3. In various embodiments, the LiMn$_{1.5}$Ti$_{0.5}$O$_4$ has a spinel structure. In yet other embodiments, the LiMn$_{1.5}$Ti$_{0.5}$O$_4$ and Li[Li$_{0.2}$Mn$_{0.54}$Ni$_{0.13}$Co$_{0.13}$]O$_2$ are evenly distributed within the cathode 12. The cathode 12 can also include an Al current collector foil, other conducting materials, such as acetylene black, carbon black and graphite, a binder, and a current collector 18. The anode 14 can include graphite or graphene coated onto a copper foil and a current collector 20. The copper foil can be rolled or electro-deposited. In some embodiments, the anode 14 is a metallic lithium foil. In still other embodiments, the anode can comprise various forms known in the art, and by way of example, may include dense lithium metal, lithium alloys such as lithium silicon and lithium tin alloys, or lithium containing porous composite electrode as desired, and a current collector 20. The separator 16 can serve as a physical and electrical barrier between the cathode 12 and the anode 14 so that the cathode 12 and anode 14 are not electronically connected within the Li-ion electrochemical cell 10. The separator 16 can comprise polypropylene, polyethylene, or other polymers known in the art. The separator 16 can be microporous and can include both organic and/or inorganic additives.

It is envisioned that the electrolyte medium of the present disclosure can be a liquid, solid, or a gel. In various aspects, the electrolyte medium may include a matrix material within which one or more Li-ion electrolytes is incorporated. The Li-ion electrolyte can be any Li-ion electrolyte, for example, any of the Li-ion electrolytes known in the art. Non-limiting examples of Li-ion electrolytes include $LiPF_6$, $LiBF_4$, $LiClO_4$, and polyoxyethylene (POE). Exemplary electrolytes can be aqueous or can include a non-aqueous electrolyte with a solvent system and a salt at least partially dissolved therein. Non-limiting examples of solvents include ethyl carbonate (EC), dimethyl carbonate (DMC), diethyl carbonate, and mixtures thereof. Additives known to those of skill in the art may also be used with the electrolytes that serve to enhance the performance of the Li-ion electrochemical cell. The Li-ion electrolyte, when incorporated in the electrolyte medium, is preferably provided in an amount that imparts a suitable level of conductivity to the electrolyte medium. In a preferred embodiment, the electrolyte is 1.0 M $LiPF_6$ dissolved in a 1:1 ratio of EC and DMC.

The materials and processes of the present disclosure are illustrated in the following non-limiting example.

EXAMPLE $M(OH)_2$ (M=Ni, Mn, Co), which is the precursor to $Li[Li_{0.2}Mn_{0.54}Ni_{0.13}Co_{0.13}]O_2$, is synthesized by a co-precipitation method. Stoichiometric amounts of nickel sulfate, cobalt sulfate and manganese sulfate are dissolved in de-ionized water. Excess sodium hydroxide solution is added to obtain mixed hydroxides. Excess Na ions are removed from the mixed hydroxides by thoroughly washing the mixed hydroxides with distilled water. After drying the washed mixed hydroxides for about 24 hours, the mixed hydroxides are blended with lithium hydroxide, then ground and pelleted. The pellets are sintered at about 900° C. for about 3 hours to obtain a final pristine $Li[Li_{0.2}Mn_{0.54}Ni_{0.13}Co_{0.13}]O_2$ material.

Spinel $LiMn_{1.5}Ti_{0.5}O_4$ is prepared by a solid-state reaction in air. Stoichiometric amounts of $Li_2CO_3$, $TiO_2$ and $Mn_2CO_3$ are ground to homogeneity in a mortar for about 5 hours to form a homogeneous powder. The homogeneous powder is pelleted and sintered in air at about 800° C. for about 20 hours to decompose the carbonate.

Active materials are prepared by mechanically mixing $LiMn_{1.5}Ti_{0.5}O_4$ and $Li[Li_{0.2}Mn_{0.54}Ni_{0.13}Co_{0.13}]O_2$ in 1:1, 1:2, and 1:3 molar ratios. Pristine $LiMn_{1.5}Ti_{0.5}O_4$ and $Li[Li_{0.2}Mn_{0.54}Ni_{0.13}Co_{0.13}]O_2$ are also active materials.

Li-ion cathodes are prepared by coating a mixture containing 80% active material, 10% acetylene black, and 10% PVDF binder on Al current collector foils, followed by heating at about 120° C. for about 1 hour. An electrode coating of about 4 $mg/cm^2$ to about 6 $mg/cm^2$, with a thickness of about 20 μm results. X-ray diffraction (XRD) patterns of the Li-ion cathodes are measured using Cu Kα radiation on a Panalytical X'Pert (Philips, The Netherlands) instrument operated at about 40 kV and about 30 mA. Data is collected in a 2θ range of about 10° to about 80° at 6°/min. Scanning electron microscopy (SEM) experiments are performed on a HITACHI S-4800.

Electrochemical measurements are carried out using CR2025 coin-type cells. Li-ion electrochemical cells are assembled with a Li-ion cathode, an anode comprising metallic lithium foil, Cellgard® 2300 (Celgard, LLC, Charlotte, N.C.) as the separator, and 1 M LiPF6 dissolved in a 1:1 ratio of ethyl carbonate (EC) and dimethyl carbonate (DMC). The Li-ion electrochemical cell is assembled in an argon-filled Labmaster 100 glove box (Mbraun Glovebox Technology, Garching, Germany). The Li-ion electrochemical cells are galvanostatically cycled at 20 mA/g from about 2.0 V to about 4.8 V (vs. $Li/Li^+$) on Land CT2001A (Wuhan Jinnuo Electronics, Ltd., Wuhan, China) battery testers at room temperature. Electrochemical impedance spectroscopy (EIS) of the Li-ion electrochemical cells is tested at the charged state of about 4.3 V and at frequencies from about 0.01 Hz to about 100,000 Hz with a perturbation amplitude of about 10 mV with a VersaSTAT MC Multichannel Potentiostat/Galvanostat (Princeton Applied Research, Oak Ridge, Tenn.) analyzer.

XRD patterns demonstrate that the lithium-rich material has a super lattice ordering character with low-intensity ordering peaks at about 21° to about 25° (2θ), which come from ordering of lithium and transition metal ions transition metal layers. The remaining peaks can be indexed to R-3m symmetry. The XRD pattern of $LiMn_{1.5}Ti_{0.5}O_4$ shows that all reflections can be indexed to a cubic spinel Fd-3m space group without obvious impurity phase, indicating a presence of Ti-partially-substituted for Mn ion in the structure. All XRD peaks of composite materials correspond to the two pristine materials as a result of mechanically mixing $LiMn_{1.5}Ti_{0.5}O_4$ and $Li[Li_{0.2}Mn_{0.54}Ni_{0.13}Co_{0.13}]O_2$ together.

SEM images show the pristine $LiMn_{1.5}Ti_{0.5}O_4$ and pristine $Li[Li_{0.2}Mn_{0.54}Ni_{0.13}Co_{0.13}]O_2$, and $LiMn_{1.5}Ti_{0.5}O_4$:$Li[Li_{0.2}Mn_{0.54}Ni_{0.13}Co_{0.13}]O_2$ composite materials. The pristine $LiMn_{1.5}Ti_{0.5}O_4$ is composed of well-crystallized octahedron particles with particle size distributions from about 1 μm to about 2 μm. The pristine $Li[Li_{0.2}Mn_{0.54}Ni_{0.13}Co_{0.13}]O_2$ is composed of about 100 nm to about 300 nm particles. The mechanically mixed composite materials consist of particles having bimodal size distributions. The larger particles are about 1 μm to about 2 μm and the smaller particles are about 200 nm. EDS maps of Co corresponding to different composite materials reveal uniform Co distribution.

Figure 2:
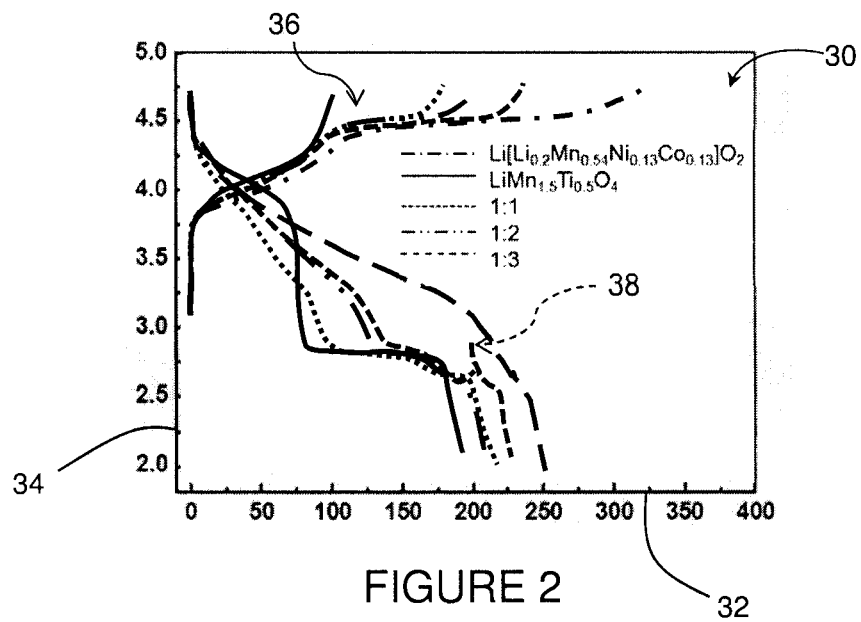
FIG. 2 depicts a graph showing initial charge-discharge profiles of $Li[Li_{0.2}Mn_{0.54}Ni_{0.13}Co_{0.13}]O_2$, $LiMn_{1.5}Ti_{0.5}O_4$, and $Li[Li_{0.2}Mn_{0.54}Ni_{0.13}Co_{0.13}]O_2$—$LiMn_{1.5}Ti_{0.5}O_4$ composite electrodes.
Figure 3:
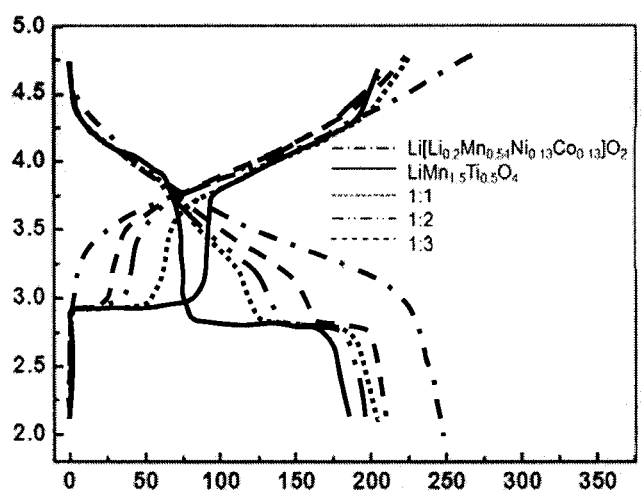
FIG. 3 depicts a graph showing second charge-discharge profiles of $Li[Li_{0.2}Mn_{0.54}Ni_{0.13}Co_{0.13}]O_2$, $LiMn_{1.5}Ti_{0.5}O_4$, and $Li[Li_{0.2}Mn_{0.54}Ni_{0.13}Co_{0.13}]O_2$—$LiMn_{1.5}Ti_{0.5}O_4$ composite electrodes.

FIG. 2 shows a graph depicting initial charge-discharge profiles of Li-ion electrochemical cells with pristine $LiMn_{1.5}Ti_{0.5}O_4$ and pristine $Li[Li_{0.2}Mn_{0.54}Ni_{0.13}Co_{0.13}]O_2$ cathodes and $LiMn_{1.5}Ti_{0.5}O_4$:$Li[Li_{0.2}Mn_{0.54}Ni_{0.13}Co_{0.13}]O_2$ composite cathodes in a voltage range of about 2.0 V to about 4.8 V at a rate of about 20 mA/g. The graph 30 has an x-axis 32 showing specific capacity in mAh/g and a y-axis 34 showing voltage in V. Table 1 below shows the charge-discharge capacity values. The graph 30 of FIG. 2 shows a plateau 36 at about 4.5 V. The plateau 36 is a likely a $MnO_2$ artifact resulting from Li extraction concomitant with oxygen release. The extracted Li cannot be fully inserted back into the lithium-rich material, leading to a large ICL value of 74 mAh/g. With an increasing amount of $LiMn_{1.5}Ti_{0.5}O_4$ in the composite cathodes, the ICL value of the initial cycle decreases. The lithium deficient spinet $LiMn_{1.5}Ti_{0.5}O_4$, which has its 16c sites empty, serves as a host for insertion of lithium ions that could not be inserted back into layered $Li[Li_{0.2}Mn_{0.54}Ni_{0.13}Co_{0.13}]O_2$ during the first discharge. There is a voltage fluctuation 38 between about 2.5 V and about 3.0 V in the first discharge profiles of the composite electrodes. The voltage fluctuation 38 is likely caused by different volume expansion/contraction behavior of layered $Li[Li_{0.2}Mn_{0.54}Ni_{0.13}Co_{0.13}]O_2$ and spinel $LiMn_{1.5}Ti_{0.5}O_4$. It is likely that after the electrolyte diffuses into cracks generated during volume changes, lithium can intercalate/deintercalate more uniformly, which is the reason the second charge-discharge profile, shown in FIG. 3, does not show any vibration. The Li-ion electrochemical cells with the 1:1, 1:2, and 1:3 $LiMn_{1.5}Ti_{0.5}O_4$:$Li[Li_{0.2}Mn_{0.54}Ni_{0.13}Co_{0.13}]O_2$ composite cathodes have an initial capacity loss of −37 mAh/g, −1 mAh/g, and −17 mAh/g, respectively.

TABLE 1

|  | $LiMn_{1.5}Ti_{0.5}O_4$ | 1:1 | 1:2 | 1:3 | $Li[Li_{0.2}Mn_{0.54}Ni_{0.13}Co_{0.13}]O_2$ |
|---|---|---|---|---|---|
| 1st charge capacity/mAh/g | 105 | 180 | 210 | 237 | 325 |
| 1st disharge capacity/mAh/g | 196 | 217 | 211 | 220 | 251 |
| 1st ICL/mAh/g | −91 | −37 | −1 | 17 | 74 |
| 1st coulombic efficiency/% | — | — | — | 93 | 77 |
| 40th cycle capacity retention/% | 81 | 84 | 83 | 90 | 77 |

FIG. 4 shows a graph 40 demonstrating cycle-life performance of Li-ion electrochemical cells with pristine $LiMn_{1.5}Ti_{0.5}O_4$ and pristine $Li[Li_{0.2}Mn_{0.54}Ni_{0.13}Co_{0.13}]O_2$ cathodes and $LiMn_{1.5}Ti_{0.5}O_4$:$Li[Li_{0.2}Mn_{0.54}Ni_{0.13}Co_{0.13}]O_2$ composite cathodes at about 20 mA/g over a voltage range of about 2.0 V to about 4.8 V. The graph 40 has an x-axis 42 showing cycle number and a y-axis 44 showing specific capacity in mAh/g. The capacity retentions are listed in Table 1. For the Li-ion electrochemical cell with the pristine $Li[Li_{0.2}Mn_{0.54}Ni_{0.13}Co_{0.13}]O_2$ cathode, an initial discharge capacity is 251 mAh/g, and a capacity retention is 77% after 40 cycles. An initial discharge capacity of the Li-ion electrochemical cell with a spinel $LiMn_{1.5}Ti_{0.5}O_4$ cathode is 196 mAh/g, with a capacity retention of 81% after 40 cycles. Though an initial discharge capacity of 220 mAh/g for the Li-ion electrochemical cell with a 1:3 $LiMn_{1.5}Ti_{0.5}O_4$:$Li[Li_{0.2}Mn_{0.54}Ni_{0.13}Co_{0.13}]O_2$ composite cathode is smaller than that for the Li-ion electrochemical cell with a pristine $Li[Li_{0.2}Mn_{0.54}Ni_{0.13}Co_{0.13}]O_2$ cathode, the cycling stability is better. In fact, the cycling stability of all the Li-ion electrochemical cells with composite electrodes are higher than that of the Li-ion electrochemical cell with a pristine $Li[Li_{0.2}Mn_{0.54}Ni_{0.13}Co_{0.13}]O_2$ cathode. The Li-ion electrochemical cell with a 1:3 $LiMn_{1.5}Ti_{0.5}O_4$:$Li[Li_{0.2}Mn_{0.54}Ni_{0.13}Co_{0.13}]O_2$ composite cathode has a capacity retention of 90% after 40 cycles, which is better than capacity retention of the Li-ion electrochemical cell with a pristine $Li[Li_{0.2}Mn_{0.54}Ni_{0.13}Co_{0.13}]O_2$ cathode after 25 cycles.

FIG. 5 shows a graph 50 with an x-axis 52 showing cycle number and a y-axis 54 showing charge transfer resistance ($R_{ct}$) in ohms. For the Li-ion electrochemical cell with a pristine $Li[Li_{0.2}Mn_{0.54}Ni_{0.13}Co_{0.13}]O_2$ cathode, an $R_{ct}$ value is 61.5Ω after the second cycle the $R_{ct}$ value rises rapidly to 108.8Ω after the twentieth cycle. The rapid increase of the $R_{ct}$ value is restrained by the use of the composite cathodes. For the Li-ion electrochemical cell with the 1:3 $LiMn_{1.5}Ti_{0.5}O_4$:$Li[Li_{0.2}Mn_{0.54}Ni_{0.13}Co_{0.13}]O_2$ composite cathode, the $R_{ct}$ value is 6.8Ω and 11.4Ω after the second and twentieth cycle, respectively. In addition, the composite cathode has a much lower total impedance than the pristine $Li[Li_{0.2}Mn_{0.54}Ni_{0.13}Co_{0.13}]O_2$ cathode, which leads to better reversibility and cyclability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cathode composition for a lithium ion battery, comprising:
   $LiMn_{1.5}Ti_{0.5}O_4$ and $Li[Li_{0.2}Mn_{0.54}Ni_{0.13}Co_{0.13}]O_2$, wherein the $LiMn_{1.5}Ti_{0.5}O_4$ and $Li[Li_{0.2}Mn_{0.54}Ni_{0.13}Co_{0.13}]O_2$ are provided in a molar ratio of about 1:3.

2. The composition according to claim 1, wherein the $LiMn_{1.5}Ti_{0.5}O_4$ comprises a spinel structure.

3. The composition according to claim 1, wherein the $Li[Li_{0.2}Mn_{0.54}Ni_{0.13}CO_{0.13}]O_2$ has a particle size of from about 100 nm to about 300 nm and the $LiMn_{1.5}Ti_{0.5}O_4$ has a particle size of from about 1 μm to about 2 μm.

4. The composition according to claim 1, wherein particles of $Li[Li_{0.2}Mn_{0.54}Ni_{0.13}Co_{0.13}]O_2$ and particles of $LiMn_{1.5}Ti_{0.5}O_4$ are evenly distributed throughout the composition.

5. A Li-ion electrochemical cell comprising a cathode, an anode, and a separator disposed between the cathode and the anode, wherein the cathode comprises a mixture of spinel $LiMn_{1.5}Ti_{0.5}O_4$ and $Li[Li_{0.2}Mn_{0.54}Ni_{0.13}Co_{0.13}]O_2$, wherein the spinel $LiMn_{1.5}Ti_{0.5}O_4$ and $Li[Li_{0.2}Mn_{0.54}Ni_{0.13}Co_{0.13}]O_2$ are provided in a molar ratio of about 1:3.

6. The Li-ion electrochemical cell according to claim 5, wherein a capacity retention of the Li-ion electrochemical cell is from about 80% to about 95% of an initial discharge capacity after about 40 cycles.

7. The Li-ion electrochemical cell according to claim 6, wherein the capacity retention of the Li-ion electrochemical cell is about 90% of the initial discharge capacity after about 40 cycles.

8. The Li-ion electrochemical cell according to claim 5, wherein a first coulombic efficiency of the Li-ion electrochemical cell is from about 75% to about 95%.

9. The Li-ion electrochemical cell according to claim 5, wherein the first coulombic efficiency of the Li-ion electrochemical cell is about 93%.

10. The Li-ion electrochemical cell according to claim 5, wherein a charge transfer resistance value of the Li-ion electrochemical cell is about 6.8Ω and about 11.4Ω after the second and twentieth cycle, respectively.

11. The Li-ion electrochemical cell according to claim 5, wherein a first irreversible capacity loss of the Li-ion electrochemical cell is less than about 20 mAh/g.

12. The Li-ion electrochemical cell according to claim 11, wherein the first irreversible capacity loss of the Li-ion electrochemical cell is about 17 mAh/g.

13. The Li-ion electrochemical cell according to claim 5, wherein a first discharge capacity of the Li-ion electrochemical cell is from about 190 mAh/g to about 255 mAh/g.

14. The Li-ion electrochemical cell according to claim 13, wherein the first discharge capacity of the Li-ion electrochemical cell is about 220 mAh/g.

* * * * *